United States Patent Office 3,322,735
Patented May 30, 1967

3,322,735
RUBBERY TERPOLYMER OF ETHYLENE AND PROPYLENE WITH CYCLOOCTATETRAENE DIMER
Frederick C. Loveless, Oakland, and Demetreos N. Matthews, Bloomfield, N.J., assignors to Uniroyal, Inc., a corporation of New Jersey
No Drawing. Filed Sept. 8, 1964, Ser. No. 395,004
2 Claims. (Cl. 260—80.5)

This invention relates to new, sulfur-curable, unsaturated terpolymers of ethylene, propylene and either 4-vinylcyclohexene (i.e., butadiene dimer) or cyclooctatetraene dimer, and to a method of making such terpolymers. More particularly the invention relates to a method of introducing certain dienes into ethylene-propylene rubber by the use of a catalyst system based on a trialkyl vanadate and an alkyl aluminum susquichloride.

The rubbery terpolymers of the invention contain 1 to 10% by weight of the diene (vinylcyclohexene or cyclooctatetraene dimer); the balance consists of ethylene and propylene in weight ratio of from 20/80 to 80/20. The terpolymers are devoid of trans unsaturation.

Although we have made many attempts at copolymerization of 4-vinylcyclohex-1-ene and of cyclooctatetraene dimer with 1-olefins, all have been unsuccessful under the ordinary conditions of polymerization using vanadate, vanadyl or pervanadyl compounds. By the use of a set of very specific conditions, we have found that either of the above dienes can be introduced into copolymers in such a random fashion that the resulting terpolymers can be cured by sulfur in formulations similar to those used for curing butyl rubber. The conditions employed are as follows:
 (1) The use of heptane as solvent.
 (2) The use of trialkyl vanadate and ethyl aluminum sesquichloride at an Al/V mole ratio within the range of from 5/1 to 100/1, preferably 10/1 to 20/1.
 (3) The use of ice-bath temperatures for the polymerization.

Sulfur-cured samples of our terpolymers, cured in a butyl-type sulfur recipe, have a gel content insoluble in cyclohexane of 90% or better.

4-vinylcyclohexene is commercially available, made by the self-condensation of butadiene in a Diels-Alder reaction.

Cyclooctatetraene dimer is a liquid described by Lord and Walker [cf. J. Am. Chem. Soc. 76, 2518 (1954)]. Its physical constants are $n_D^{25}=1.5858$, and $$b_{2.6}=126-127°$$

(uncorrected). The compound shows adsorption at 1606 and 1580 cm.$^{-1}$, indicative of the double bonds present. This liquid dienic dimer has been shown by Nyburg and Hilton (Chemistry and Industry, August 3, 1957, pages 1072–3) to have the structure

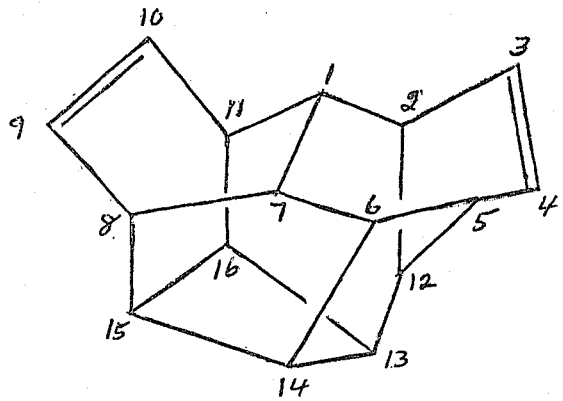

The systematic name of this chemical is heptacyclo [5.4.0.1$^{2,5}$.2$^{6,12}$.2$^{8,11}$.0$^{13,16}$.0$^{14,15}$]-3,9-hexadecadiene.

EXAMPLE I

In a 2-liter, 3-necked flask equipped with stirrer, condenser, thermometer, addition funnel and a tube for subsurface feeding of the gaseous monomers, 700 cc. of heptane were saturated with a 50/50 feed of ethylene and propylene (total feed=4 liters/minute) over a 15-minute period. The flow of monomers was continued throughout the run. Then 8 cc. of a .25-M solution of ethylaluminum susquichloride in heptane were added and the pot contents cooled to 3° C. by use of an ice-salt mixture. The dropwise addition of 30 cc. of heptane containing 1 cc. of cyclooctatetraene dimer was begun, then 1 cc. of 0.1-M tri-n-butyl vanadate solution was introduced, whereupon polymerization began and the temperature rose to a high of 13.5° C. in twelve minutes. The reaction was killed after 20 minutes by the addition of isopropyl alcohol and an antioxidant. The polymer was flocced in alcohol, and after drying, a 16.8 g. yield of rubbery polymer was obtained. The infrared spectrum showed strong absorption at 3030 and 1610 cm.$^{-1}$, indicative of unsaturation in the terpolymer. The polymer was then compounded for vulcanization, as follows:

| | Parts by wt. |
|---|---|
| Polymer | 100 |
| Stearic acid | 0.5 |
| Tuex [1] | 1.0 |
| MBTS | 0.5 |
| Sulfur | 2.0 |
| Zinc oxide | 5.0 |

[1] Tetramethylthiuram disulfide.

The press cure was carried out at 308° F. for 1 hour. The vulcanizate had a gel content of 95% and a swelling index of 8.7, in cyclohexane at room temperature.

EXAMPLE II

Using the same procedure as in the previous example except that 10 cc. of 4-vinylcyclohexene in 30 cc. of heptane were used in place of the cyclooctatetraene dimer solution, and that a second equal addition of catalyst ingredients was made after 10 minutes, a yield of 21.4 grams of polymer was obtained. The polymer has the following properties:

[η]=2.95 (135° in tetralin)
Ethylene/propylene ratio=46/54
Percent crystallinity by X-ray=0
Iodine number=2.2

The polymer cured in the recipe given in Example I had a gel content of 90% in cyclohexane, and a swelling index of 28.5.

The terpolymers of the invention may be used for making such articles as pneumatic tires, footwear, belts, inner tubes, or parts thereof, if desired in admixture with other materials such as butyl rubber, natural rubber, SBR, etc. The terpolymers may be extended with oil (up to, for example 100 or 200 or more parts per 100 of rubber) and may if desired be reinforced with carbon black, silica, lignin or other fillers. The terpolymers may be cured with curatives other than sulfur, for example, brominated dimethylol phenols plus catalysts such as stannous chloride dihydrate.

Having thus described our invention, what we claim and desire to protect by Letters Patent is:
 1. Unsaturated, sulfur-vulcanizable, rubbery terpolymer of ethylene, propylene and heptacyclo [5.4.0.1$^{2,5}$.2$^{6,12}$.2$^{8,11}$.0$^{13,16}$.0$^{14,15}$] - 3,9 - hexadecadiene, the terpolymer containing from 1 to 10% by weight of said diene and the balance of the terpolymer being ethylene and propylene in weight ratio of from 20/80 to 80/20, the terpolymer being devoid of trans unsaturation.

2. A method of making an unsaturated, sulfur-vulcanizable, rubbery terpolymer of ethylene, propylene and heptacyclo[5.4.0.1$^{2,5}$.2$^{6,12}$.2$^{8,11}$.0$^{13,16}$.0$^{14,15}$]-3,9-hexadecadiene comprising subjecting a mixture of the said monomers, in $n$-hexane as a solvent, to ice bath temperature, in the presence of a catalytic amount of a polymerization catalyst comprising a trialkyl vanadate and alkyl-aluminum sesquichloride, the Al&V ratio in the said catalyst being within the range of from 5/1 to 100/1, until a rubbery terpolymer is formed, the said rubbery terpolymer containing combined therein from 1 to 10% by weight of said diene and the balance of the terpolymer being combined ethylene and propylene in weight ratio of from 20/80 to 80/20, the terpolymer being devoid of trans unsaturation.

References Cited

UNITED STATES PATENTS

| | | | |
|---|---|---|---|
| 3,211,709 | 10/1965 | Adamek et al. | 260—80.5 X |
| 3,222,333 | 12/1965 | Duck et al. | 260—80.7 |

JOSEPH L. SCHOFER, *Primary Examiner.*

JAMES A. SEIDLECK, *Examiner.*

W. HOOVER, *Assistant Examiner.*